United States Patent [19]

Guenther

[11] 3,792,382

[45] Feb. 12, 1974

[54] FILTER FOR ELECTRICAL OSCILLATIONS

[75] Inventor: Alfhart Guenther, Haar, Germany

[73] Assignee: Siemens Aktiengesellschaft, Berlin & Munich, Germany

[22] Filed: Mar. 19, 1973

[21] Appl. No.: 342,491

[30] Foreign Application Priority Data

Mar. 23, 1972 Germany.................. P 22 14 252.5

[52] U.S. Cl. ................................ 333/72, 333/73 R
[51] Int. Cl. ........................ H03h 9/26, H03h 13/00
[58] Field of Search ............ 333/71, 72, 73 R, 30 R

[56] References Cited

FOREIGN PATENTS OR APPLICATIONS 1,541,975 12/1969 Germany ............................. 333/71

*Primary Examiner*—Eli Lieberman
*Assistant Examiner*—Marvin Nussbaum
*Attorney, Agent, or Firm*—Hill, Sherman, Meroni, Gross & Simpson

[57] ABSTRACT

A filter for electric oscillations comprises $n$ resonators, where $n = 4$, which are coupled by line elements and have line characteristics. The filter has an input impedance which tends to zero on at least one side of the pass band, and also has a maximum at a given frequency, the echo attenuation in the pass band having more than one maximum. At least two of the echo attenuation poles occur at non-physical frequencies ($p_o = \pm \sigma + j\omega$). The absolute value of the real part ( $\sigma$ ) of the poles amounts to at least the $n^{th}$ part of the 3dB bandwidth of the filter.

11 Claims, 5 Drawing Figures

FILTER FOR ELECTRICAL OSCILLATIONS

BACKGROUND OF THE INVENTION

1. Field of the Invention

This invention relates to filters for electric oscillations, and more particularly to filters which comprise a plurality of resonators which are coupled via line elements and have line characteristics, which filters have an input impedance which tends towards zero at least on one side of the pass band and on this side have an input impedance maximum at a given frequency and the echo attenuation of which possesses more than one maximum in the pas band.

2. Description of the Prior Art

An occasional requirement in the design of filters is that an operative impedance maximum of the filter should occur at a given frequency. As is known, in filters of conventional design, for example filters operating in accordance with wave parameter theory or the so-called polynomial filters, such an operational impedance maximum occurs at an arbitrary frequency lying in the stop band of the filter. No attention is paid to this frequency state in the design of the filter, since only the other properties, such as e.g., the maximum permissible attenuation in the pass band and the blocking attenuation increase are the characterizing parameters. In the design of filters it is frequetly necessary to set the operational impedance maximum at a specific, given frequency positon if filters which were initially designed to be independent of one another are to be connected to form a composite filter. German Pat. No. 1,902,091, as open to inspection, suggests setting the operational impedance maximum of one filter at the center of the pass band of another. In the provision of filters having concentrated elements, this may be realized relatively simply because a large number of circuit structures are available which may consist of concentrated elements and the number of possible structures includes at least one whose operational impedance maximum lies at the correct frequency position and also meets the other conditions. In the provision offilters consisting of line elements such as for example microwave filters or mechanical filters, the additional difficulty occurs that, dueto their physical nature, the line elements employed hae a compulsory predetermined electrical equivalent structure and cannot be interconnected with arbitrary freedom of form at an economical cost.

SUMMARY OF THE INVENTION

An object of the invention is to provide possibilities of setting the frequency position of the operational impedance maximum in filters of the type described above and consisting of line elements without the other filter properties, as a consequence, suffering to an impractical extent.

The invention resides in the provision of a filter for electric oscillations comprising a plurality of resonators which are coupled via line elements and have line characteristics, which filterhas an input impedance which tends towards zero at least on one side of the pass band, and on this side has an input impedance maximum at a given frequency. The echo attenuation of the filter possesses more than one maximum in the pass band, and the filter $n$ resonators where $n \geqq 4$. At least two of the echo attenuation poles of the filter occur at non-physical frequencies ($p_o = \pm\sigma + \pm j\ \omega_o$). The absolute value of the real part ($|\sigma_o|$) of this complex echo attenuation pole positioning amounts to at least the $n_{th}$ part of the 3dB bandwidth $B_o$ of the filter.

BRIEF DESCRIPTION OF THE DRAWINGS

Other objects, features and advantages of the invention, its organization, construction ad operation will be best understood from the following detailed description taken in conjunction with the accompanying drawings, on which.

DESCRIPTION OF THE PREFERRED EMBODIMENT

Figure 1:
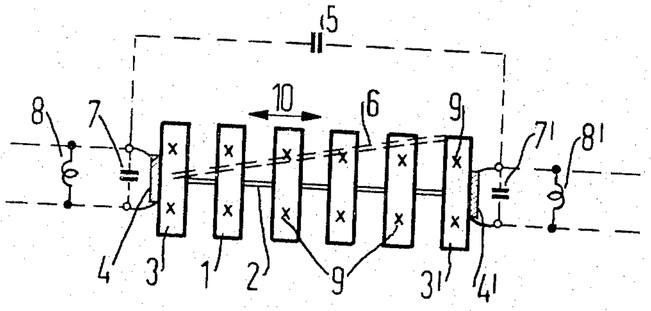
FIG. 1 schematically illustrates the construction of amechanical filter.

FIG. 1 shows a mechanical filter as an example of a filter consistinf of line elements. A characteristic of such filters is that the individual filter elements or at least parts of the individual filter elements do not consist of concentrated circuit elements such as coils and capacitors, but of elements which possess line characteristics and whose physical properties can be determined and calculated with the aid of line theory. This applies both to the resonators of the filter and to the coupligs between the individual resonators. The same principles also apply to microwave filters in which, as is known, the geometrical dimensions of the individual elements, relative to the wave length, cannot be neglected so that these elements also possess line characteristics.

The mechanical filter shown in FIG. 1 consists of a plurality of resonators 1, which are mechanically coupled to one another through a coupling element 2. In the exemplary embodiment, the resonators take the form of bending mode resonators, which is indicated by the oscillation mnodes marked 9. At the oscillating nodes, the filter can be supported by elements, which are not shown in the drawing for the sake of clarity, which can be suitable support elements also secured, e.g., to a base plate. The conversion of electrical energy into mechanical oscillating energy or the reconversion of the mechanical oscillating energy into electric energy takes place at the end resonators 3 and 3'. For this purpose these end resonators are provided with respective elements 4 and 4' which exhibit an electrostrictive eeffect and which are preferably made of piezoceramic material. The electromechanical converter elements 4 and 4', are secured in the conventional manner, for example by soldering, to the end resonators and are provided on the area facing away from the end resonators 3 and 3' with a thin metallization forming an electrode to which is conducted one of the two electric supply lines. The secondelectric supply line is directly connected to the metallic resonators and, for example, the piezoceramic plates 4 and 4' are provided with a polarizing field running in the direction of the longitudinal axis of the filter, i.e., therefore with a polarization in the direction of the coupling element 2. If an electric alternating voltage is applied between the metallized electrode of the plate 4 and the resonator 3, the resonator is excited, via the so-called cross-contraction effect, to bending mode oscillations in the direction of the double arrow 10, as long as its resonating frequency is at least paproximately equal to the frequency of the applied alternating voltage. These bending oscillations are transferred via the coupling element 2 to the resonators 1 and to the second end resonator 3', where they are reconverted in converse fashion, via the piezoceramic plate 4' into electric oscillations.

As indicated in FIG. 1 by broken lines, capacitors 7 and 7' can be connected in parallel respectively with the electromechanical converter elements 4 and 4', so that tthe static capacitance of the converter elements 4 and 4' may be increased. The individual converter elements may be supplemented by adding coils 8 and 8' respectively in association with tthe capacitors 7 and 7' to form parallel resonance circuits. These parallel resonance circuits must be additionally taken into consideration in the calculation of the number $n$ of filter circuits.

In the embodiment shown in FIG. 1, an additional mechanical coupling 6 between the resonators 3 and 3' can also be provided to produce a pair of attenuation poles.

The resonators 3 and 3' do not necessarily have to be connected and the coupling can be co-phasal instead of in anti-phase as shown, as a result of which the increase in gradient of the attenuation is replaced by a phase linearization. Such additional couplings are made between resonators which are not directly adjacent.

A mechanical coupling can be replaced by an electric coupling, indicated in FIG. 1 by the capacitor 5 shown in broken lineswhich is arranged between the input converter and the output converter.

Figure 2:
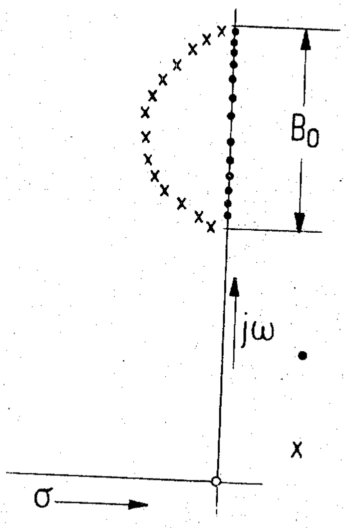
FIG. 2 graphically shows the distribution of zeros in thecomplex frequency plane of conventional filters.

As already mentioned in the introduction, when designing filters in accordance with the insertion loss theory, one commences from the so-called characteristic function and introduces the so-called complex frequency $p = \sigma + j\ \omega$as a frequency variable, wherein $\sigma$ is the real part and $j\omega$ is the imaginary part. Here, the characteristic features of a filter are the positions of the zeros of the so-called characteristic function and the positions of the zeros of the so-called characteristic function and the positions of the zeros of the Hurwitz polynomial in the complex frequency plane. In filters which are constructed in accordance with conventional known design processes, and which are designed without taking into account aspecial frequency state of the driving point impedance, the zeros of the characteristic function lie on the $j\omega$ axis, whereas the zeros of the Hurwitz polynomial lie in the left $P$-half plane. This distributiion is illustrated in FIG. 2 in which the zeros of the characteristic function are indicated by dots and the zeros of the Hurwirz polynomial are indicated by crosses. As shown in FIG. 2, the zeris of the Hurwitz polynomial lie on locus which is very similar to an ellipse and the 3dB bandwidth $B_o$ is determined by the frequency band on the $j\omega$ axis which results ffrom the intersection points of this imaginary ellipse with the $jj\omega$ axis. The zeros of the characteristic function simultaneously form the matching points in the pass band, which is synonymous with the pole positions of the echo attenuation.

Figure 3:
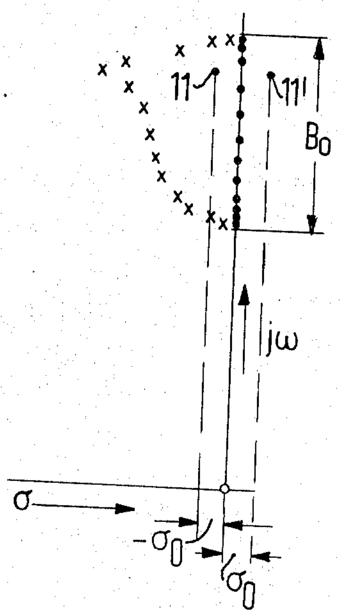
FIG. 3 graphically shows the distribution of zeros in the complex frequency plane of filters in accordance with the invention.

FIG. 3 shows the distribution of the positions of the zeros of the characteristic function and the Hurwitz polynomial in a filter designed in accordance with the invention. By way of example, the two echo attenuation poles 11, 11' are placed in such a manner that they occur at non-physical frequencies, i.e., thus at the complex frequencies $p_o = \pm\sigma_o + j\ \omega_o$. Here, attention should be paid that the absolute value $|\sigma_o|$ of the real part of this complex echo attenuation pole positioning amounts to at least the $n_{th}$ part of the3dB bAndwidth $B_o$ of the filter, in which $n$ is the number of filter elements contained in the filter, plus any possible electric end circuits. As shown by the analysis of this filter, at least four resonators arerrequired for the realization of a filter in accordance with the invention.

When the distribution of the zeros is arranged in suitable fashion, as shown in FIG. 3, there are no distortions of the Tschebyscheff characteristic of the operational attenuation ripple, and the number of waves is only two lower than in a filter having the characteristics shown in FIG. 2. This permits the frequency state of the driving point impedance maximum to be influenced, at a given bandwidth, pass ripple factor and blocking flank gradient.

The detailed calculation of the circuit elements takes place in accordance with known methods. The following explanations refer to the example of a symmetrical filter.

The characteristic function K of a symmetrical filter with tthe chain matrix $$\begin{bmatrix} A & B \\ C & A \end{bmatrix}$$

is a function of the filter elements $E_\nu$ $$K = (B-C)\ /2\ 2 = K\ (E_1, E_2. \dots E_m).$$

in which $\nu$ is a numerical variable between the numbers 1 and $m$.

In a a $n_{th}$ grade filter, the characteristic function is a parabola of the $n_{th}$ grade, and is therefoe characterized by $m = n1$ features (curve points, end points, inflection points etc.). With very good approximation, this allso applies to filters including lineresonators, if the higher inherent frequencies are far removed and this is generally the case. A number $m$ filter elements which are independent of one another are required for the realization of a characteristic function with $m$ features. The total differential of the characteristic function, with regard to the elements is $$dK = \sum_{\nu=1}^{m} \frac{\partial K}{\partial E_\nu} dE_\nu$$

and, replacing the differentials by differences $$\Delta K = \sum_{\nu=1}^{m} \frac{\delta K}{\delta E_\nu} \Delta E_\nu + R$$

When the nonlinear remaining power R is small, $\Delta K$ represents the deviation from the theoretical behavior and $\Delta E_\nu$ the necessary element modifications; the sensitivities $\delta K/\delta E_\nu$ are determined by analysis. A number $m$ equations of this type are required where, e.g. $K$ is interpreted in the first and second equation as lower and upper band edge, in the third and fourth as rear and imaginary part of the complex echo attenuation pole and in the other $m-4$ equations as an extreme vale of the characteristic function. Generally the process converges after a few iterations.

Filters designed in accordance with the above statements also have the following properties:

The circuit grade has apparently been reduced by two, and the flank gradient reduces somewhat —however, in no way corresponding to a reduction in grade by two —the overall decrease being variously distributed between the two flanks. The closer to the band edge the engagement takes place, the more the adjacent flank is weakened and the less the opposite flank is weakened, and the maxima of thedriving point impedance below and above the band edges move from lower to higher frequencies, if the unification of the attenuation maxima, commencing at the lower band edge, is effected step by step at higher three-unit groups.

With a filter designed for a pass band of 48.3 to 51.4 kHz, the following tabulated figures result.

| Tonvergence of the $a_B$ wave group | Position of $(W/Z)_{max}$ |
|---|---|
| 4 -6 | 51700 Hz |
| 5-7 | 51710 Hz |
| 6-8 | 51730 Hz |
| 7-9 | 51800 Hz |
| 88-10 | 51930 Hz |
| 9-11 | 52100 Hz |

The term $a_B$ wave group is to be understood as the number of extremes occurring in the pass band between the matching points. The value $(W/Z)_{max}$ is the quotient of the input driving point impedance maximum and a reference impedance $Z$, which will be explained with reference to FIG. 5.

A fine adjustment of the impedance maximum is possible by detuning the electric end circuits in such a manner that the total of detunings amounts to zero; the distortion of the transmission behavior is then minimal. The mechanical body of the filter can havethe complete element symmetry which is favorable from the-production point of view.

The above-described arrangement may be modified by unifying two or more echo attenuation poles, resulting in a multiple, but real, zero positioning of the characteristic function.

The above-described filter is preferably used in systems in which relatively high requirements are placed on the properties of the filter, and therefore it may be used with particular advantage for filters in carrier frequency units. As is known, in these cases theaudio bandwidth is approximately 3 kHz, so that bandwidths of morethan 2 kHz are particularly favorable for the described filter.

Figure 4:
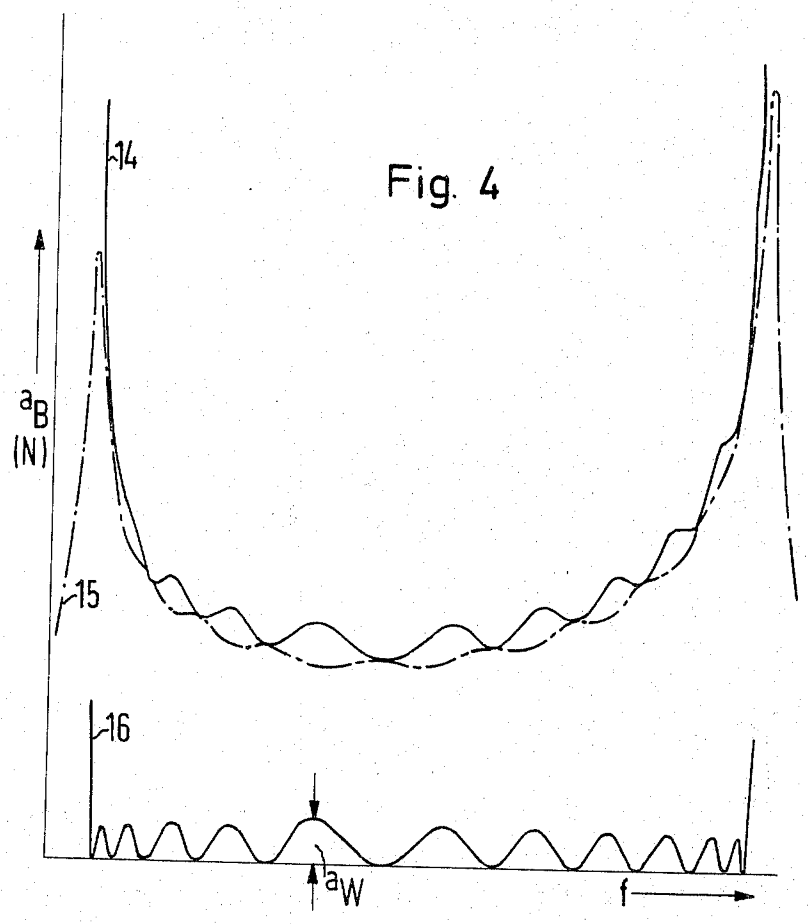
FIG. 4 is a graphical illustration of the attenuation curves in a filter in accordance with the invention.

TThe filter may be designed with unsteepened attenuation characteristic, for example with Chebyshev characteristic, at any rate a nonmonotonous, monotonous, attenuation behavior in the pass band. In accordance with the invention, the end circuits are provided with a bandwidth $B_1$, which satisfies the condition $B_1 \geqq 0.3366\ (1-w)/(1+W)\cdot nB_o$, wherein $$w=\sqrt[n]{\tan h\,\frac{a_w}{2}}$$

and $a_w$ is the geometric mean of the insertion loss ripple, expressed in nepers, in the pass band, after deduction of the loss attenuation caused by the final values of the resonators. This is represented in detail in FIG. 4, in which theinsertion loss $a_B = a_o + a_v$, plotted against the frequency $f$ is shown by the solid curve 14. The dotted curve 15 shows the course of the loss attenuation $a_v$ in dependence upon the frequency and the solid curve 16 shows the filter attenuation $a_o$, whose maxima are $a_w$.

With the use of reactance bridges, attenuation poles at finite frequencies may be produced or poles at complex frequencies to influence the group delay. Reactance bridges of this kind are realized, for example in FIG. 1, by an electric circuit element such as, e.g., the capacitor 5, or by a mechanical line such as, e.g., the coupling 6 leading from the resonator 3 to the resonator 3'. Here, in a simiilar way to the coupling element 2 which codetermines the filter bandwidth, the mechanical coupling element 6 executes longitudinal oscillations. Bridges, such as those shown in FIG. 1, from end circuit to end circuit possess theadvantage that they do not substantially influence the filter behavior in the pass band in practice, and yet clearly increase the gradient of the stop band. They have the advantage that they consequently do not require to be taken into account in the dimensioning of the filter, and only require to be applied subsequently for the fine adjustment. The end circuits, i.e., thus either the resonators 3, 3' in association with the converters 4, 4', or the electric end circuits formed from concentrated circuit elements and consisting of the capacitors 7, 7', and the coils 8, 8', are so dimensioned that theitheir bandwidth $b_1$ satisfies the condition $B_1 \geqq 0.366\ (1-w)/(1+w)\cdot nB_o$.

Figure 5:
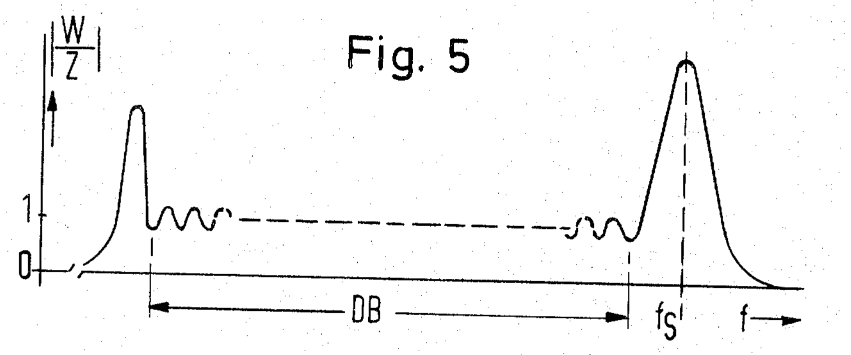
FIG. 5 is a graph relating the operational input impedance with frequency.

In FIG. 5, the ratio $W/Z$ between driving point input impedance and a reference impedance, in particular the terminating impedance $Z$, is plotted in dependence upon the frequency. In thepass band DB of the filter, this impedance ratio has an approximate value of 1 and exhibits an approximate Chebyshev behavior. The broken line is to indicate that filters with an arbitrary number $n$ of filter resonators can be employed, since, as is known, the number of maxima and minima occurring in the pass band DB depend upon the number of resonance circuits employed. Outside the pass band, i.e., at a predeterminable frequency $f_s$, the driving point input impedance ratio $W/Z$ possesses a maximum and this maximum may in fact be freely selected by tehe described dimensioning rules within relatively wide frequency limits.

Although I have described my invention by reference to a specific illustrative embodi embodimentt, many changes and modifications thereof may become apparent to those skilled in the art without departing from the spirit and scope of the invention. I therefore intend to include within the patent warranted hereon, all such changes and modifications as may reasonably ad properly be included within the scope of my contribution to the art.

I claim:

1. A filter for electric oscillations comprising a plurality of resonators which have line characteristics, line elements coupling said resonators, said filter having input impedance which tends towards zero at least on one side of its pass band, and on this side has an input impedance maximum at a given frequency, and the echo attenuation of the filter possessing more than one maximum in the pass band, wherein said filter comprises $n$ resonators, where $n$ =4 I at least two echo attenuation poles occurring at non-physical frequencies ($p_o = \pm\sigma_o + j\,\omega_o$) and the absolute value of the real part ($|\sigma|$) of this complex echo attenuation pole positioning amounts to at least the $n_{th}$ part of the 3 dB bandwidth $B_o$ of the filter.

2. A filter as claimed in claim 1, wherein the bandwidth of the filter is greater than b 2 kHz.

3. A filter as claimed in claim 1, wherein the attenuation characteristic is not steepened by finite attenuation poles and the bandwidth $B_1$ of its end circuits satisfies the equation $B_1 \geqq 0.366\ (1 - w)/(1 + W) \cdot nB_o$, where e $$w = \sqrt[n]{\tan h \left(\frac{a_w}{2}\right)}$$

and $a_w$ is the geometric mean of the insertion loss ripple, expressed in nepers, in the pass band, after the subtraction of the loss attenuation due to the finite Q-factors of the resonators.

4. A filter as claimed in claim 1, wherein said resonators are mechanical resonators which are mechanically coupled to one another.

5. A filter as claimed in claim 1, wherein there is provided a reactance bridge from the first to the last resonator and the bandwidth $B_1$ of its end circuits satisfies the equation $B_1\quad 0.366\ (1-W)/(1+W) \cdot nB_o$.

6. A filter as claimed in claim 5, wherein said resonators are mechanical resonators which are mechanically coupled to one another.

7. A filter as claimed in claim 6, wherein the reactance bridge is a mechanical line.

8. A filter as claimed in claim 6, wherein the reactance bridge is a concentrated circuit element.

9. A filter as claimed in claim 1, wherein at least one of the end resonators is a resonant circuit consisting of concentrated circuit elements.

10. A filter as claimed in claim 9, wherein saidresonators are arranged symmetrically and wherein the two electric end circuits are made up of elements having different dimensions.

11. A filter as claimed in claim 1, wherein said resonators are in the form of bending mode oscillators and the coupling elements are in the form of longitudinal mode couplers.

* * * * *

UNITED STATES PATENT OFFICE
CERTIFICATE OF CORRECTION

Patent No. 3,792,382 Date February 12, 1974

Inventor(s) Alfhart Guenther

It is certified that error appears in the above-identified patent and that said Letters Patent are hereby corrected as shown below:

Read the application No. "342,491" as --342,431--.

Signed and sealed this 24th day of December 1974.

(SEAL)
Attest:

McCOY M. GIBSON JR.
Attesting Officer

C. MARSHALL DANN
Commissioner of Patents